United States Patent
Hyvrard et al.

(10) Patent No.: US 10,987,531 B2
(45) Date of Patent: Apr. 27, 2021

(54) METHOD FOR STABILIZING METALLIC MERCURY

(71) Applicant: SARP INDUSTRIES, Limay (FR)

(72) Inventors: Francois Hyvrard, Villennes sur Seine (FR); Julien Borrini, Mantes-la-jolie (FR); Dieter Offenthaler, Heimberg (CH); Xavier Ibarz Formatger, Wimmis (CH)

(73) Assignee: SARP INDUSTRIES, Limay (FR)

( * ) Notice: Subject to any disclaimer, the term of this patent is extended or adjusted under 35 U.S.C. 154(b) by 643 days.

(21) Appl. No.: 15/736,605

(22) PCT Filed: Jun. 16, 2016

(86) PCT No.: PCT/FR2016/051465
§ 371 (c)(1),
(2) Date: Dec. 14, 2017

(87) PCT Pub. No.: WO2016/203162
PCT Pub. Date: Dec. 22, 2016

(65) Prior Publication Data
US 2018/0185685 A1 Jul. 5, 2018

(30) Foreign Application Priority Data
Jun. 17, 2015 (FR) .................. 15 55521

(51) Int. Cl.
*A62D 3/33* (2007.01)
*C01G 13/00* (2006.01)
*A62D 101/43* (2007.01)
*A62D 101/24* (2007.01)

(52) U.S. Cl.
CPC .............. *A62D 3/33* (2013.01); *C01G 13/00* (2013.01); *A62D 2101/24* (2013.01); *A62D 2101/43* (2013.01)

(58) Field of Classification Search
CPC ........ B01D 53/64; B01D 53/74; B01D 53/78; B01D 2251/30; B01D 2257/304; B01D 2257/60; B01D 2257/602; C01G 13/00; C01B 17/20; C01B 2210/0095; C01B 2210/0093; C02F 1/62; C02F 2101/20
See application file for complete search history.

(56) References Cited

U.S. PATENT DOCUMENTS

| 3,061,412 | A | | 10/1962 | Giordano | |
|---|---|---|---|---|---|
| 3,674,428 | A | * | 7/1972 | Dean et al. | C01D 1/32 423/106 |
| 3,749,761 | A | * | 7/1973 | Dean et al. | C01G 13/00 423/562 |
| 4,147,626 | A | * | 4/1979 | Findlay | C02F 1/5236 210/724 |
| 5,360,632 | A | | 11/1994 | Johnson et al. | |
| 6,312,499 | B1 | | 11/2001 | Rehmat et al. | |
| 6,403,044 | B1 | | 6/2002 | Litz et al. | |
| 7,560,087 | B2 | | 7/2009 | Riviere-Huc et al. | |
| 9,498,747 | B2 | * | 11/2016 | D'Amico | C04B 7/364 |
| 9,873,636 | B2 | * | 1/2018 | D'Amico | C22B 43/00 |
| 2007/0053827 | A1 | | 3/2007 | Berg et al. | |
| 2008/0234529 | A1 | | 9/2008 | Chan et al. | |
| 2014/0271418 | A1 | * | 9/2014 | Keiser | B01D 53/78 423/210 |

FOREIGN PATENT DOCUMENTS

| DE | 41 23 907 A1 | * | 1/1993 | .......... B01D 53/64 |
|---|---|---|---|---|
| DE | 10 2007 061 791 A1 | | 6/2009 | |
| DE | 10 2012 102 981 B3 | | 10/2012 | |
| EP | 2 072 468 A2 | | 6/2009 | |
| JP | S49-121795 A | | 11/1974 | |
| JP | S50-046592 A | | 4/1975 | |
| JP | S52-061196 A | | 5/1977 | |
| JP | 61-033299 A | * | 2/1986 | .......... C02F 1/62 |
| JP | H02-034688 A | | 2/1990 | |
| JP | H03-010033 A | | 1/1991 | |
| JP | H06-091129 A | | 4/1994 | |
| JP | 2006-249234 A | | 9/2006 | |
| JP | 2008-208423 A | | 9/2008 | |
| JP | 2013-503729 A | | 2/2013 | |
| JP | 2015 147210 A | * | 8/2015 | .......... B01D 53/64 |
| WO | 2006/016076 A1 | | 2/2006 | |

OTHER PUBLICATIONS

International Search Report, dated Sep. 21, 2016, from corresponding PCT application No. PCT/FR2016/051465.
Li, "Removal of mercury from wastewater with 25 polysulfides," Chlor-Alkali Industry, Issue 02, pp. 75-77, Dec. 31, 1983.

* cited by examiner

Primary Examiner — Timothy C Vanoy
(74) Attorney, Agent, or Firm — Nixon & Vanderhye

(57) ABSTRACT

Disclosed is a method for stabilizing metallic mercury in the form of mercury sulfide. The method includes the following steps: a) dispersing metallic mercury in a polysulfide aqueous solution so as to convert the metallic mercury into mercury sulfide; and b) separating the mercury sulfide.

18 Claims, No Drawings

METHOD FOR STABILIZING METALLIC MERCURY

This invention relates to a process for stabilising metallic mercury in the form of mercury sulphide, in particular in readiness for final or reversible storage.

Mercury has been widely used in the recent historic period for industrial and domestic applications, chemicals (particularly chemistry of chlorine and polymers), batteries, measurement instruments and dental amalgams. Oil and gas extraction faces the problem of natural pollution of some deposits by this compound that has to be extracted and removed from hydrocarbons. Mining extraction activities are also concerned, as are frequently illegal placer mining activities.

The toxicity of mercury for natural environments and living organisms is well known. Metallic or elementary mercury is toxic for central and peripheral nervous systems. Inhalation of mercury vapours can have noxious effects on nervous, digestive and immune systems, and on the lungs and kidney, and can be fatal.

Neurological and behavioural disorders can be observed after exposure to metallic mercury by inhalation. Symptoms include in particular trembling, insomnia, memory loss, neuromuscular effects, headaches and motor and cognitive disorders. Moderate infraclinical signs can be observed in persons who were exposed at work to a concentration of metallic mercury in air equal to 20 µg/m3 or more over several years. Repercussions have also been observed on the kidneys, varying from an increase in the protein content in urine to renal insufficiency.

Measures are taken internationally to control and limit the use of metallic mercury and its compounds. For example, the Minamata Convention set up as part of the United Nations Program for the environment, calls for international action to be engaged to manage mercury efficiently, effectively and coherently, as per Decision 25/5 adopted on 20 Feb. 2009. In Europe, there is the Regulation (EC) No. 1102/2008 of the European Parliament and the Council of 22 Oct. 2008 on the banning of exports of metallic mercury and some mercury compounds and mixtures and the safe storage of this substance.

Due to these commitments, a large quantity of mercury can no longer be recycled and reused, particular mercury derived from the chlorine and soda industries, purification of natural gas, extraction and melting operations of non-ferrous metals and extraction of cinnabar ore in the European union. The quantity of liquid metallic mercury concerned is estimated to be about 12,000 tonnes by 2020-2025.

In this context, industrial processes should be developed to solidify and stabilise this metal in a form in which it can be stored and manipulated in complete safety. The mercury compound obtained can then be stored in dangerous waste storage facilities, for example such as underground sites.

A distinction can be made between three major principles among the different technologies used to stabilise metallic mercury: the formation of an amalgam with another metal, incorporation of mercury into a matrix, usually inorganic but sometimes organic, and finally the formation of mercury sulphide.

Processes for stabilising metallic mercury based on the formation of an amalgam with copper are described for example in U.S. Pat. No. 6,312,499 and patent application US 2008/0234529. This type of process requires a source of noble metal that is not good for the global environmental balance and for the economics of the system. The quantity of the final residue to be stored can be large. Another disadvantage of this type of process is that amalgams, although they are solid, have a significant vapour pressure and a significant solubility of mercury, and thus create a problem in terms of their stability.

The most frequently used process for treating mercury is transformation of mercury into mercury sulphide. Mercury sulphide is a stable form of mercury that is found in ore. Two principle crystalline forms are observed: one, cinnabar, is red (the vermilion pigment has been highly prized since antiquity), and the other, metacinnabar, is black. Their crystalline structure is different, le cinnabar is hexagonal and metacinnabar is cubic. However, their chemical and physical properties are very similar. The two compounds are insoluble in cold water and nitric acid and are soluble in aqua regia.

Patent applications WO 2006/016076, DE 102012102981, DE 102007061791 and EP 2072468 describe methods of controlling the reaction between metallic mercury and elementary sulphur. These methods usually require complicated and energy-intensive measures and a large excess of sulphur to achieve complete conversion.

For example, WO 2006/016076 describes a method of stabilising metallic mercury with sulphur in the solid state in a rotary reactor in which mercury and sulphur can be mixed non-intrusively. Despite the fact that the mercury sulphide obtained seems to satisfy French regulations in terms of leaching, mercury droplets are observed in the final product in some tests and the mercury vapour pressure in the reactor remains significant.

Patent application DE 102012102981 describes the stabilisation of metallic mercury in the form of mercury sulphide by a liquid-liquid reaction between metallic mercury and sulphur in the molten state at a temperature of 120-150° C. in a counter-current reactor. In addition to the obvious energy cost of this process, the application provides no data that can be used to assess the performance of the transformation and the quality of the mercury sulphide obtained.

Patent application DE102007061791 describes a process for preparing mercury sulphide from metallic mercury and elementary sulphur. This process is performed at high temperatures, particularly close to the boiling temperature of mercury, advantageously combined with a pressure slightly lower than atmospheric pressure. 18 to 44% excess sulphur above stoichiometry is recommended to guarantee a complete reaction of mercury.

Patent application EP2072468 A1 describes a process of transforming metallic mercury and sulphur into mercury sulphide in the gaseous phase. The temperature of the process is higher than 500 or even 580° C., above the boiling point of mercury sulphide. Mercury sulphide is then extracted in the gaseous phase, cooled to 50° C. by sprinkling of water and then separated from water.

In summary, all these processes make use of the reaction between metallic mercury and sulphur, requiring complicated and energy-intensive measures. They usually also require a large excess quantity of sulphur to achieve complete conversion.

The use of aqueous solutions of polysulphides has also been suggested. For example, U.S. Pat. No. 6,403,044 thus discloses a process for stabilising metallic mercury in which the mercury or a waste containing mercury is stabilised in several mixing steps. Firstly, a mixture of an amalgamation agent composed of sulphur or other products (excluding polysulphides) is mixed with the mercury waste. This mixture is blended for a first time. An additive load composed of microporous materials (earth, sand, cement, silica gel, perlite, active carbon, etc.) and water is added to this first mixture. This new mixture is then blended again. A polysulphide solution is added to activate the reaction between mercury and the amalgamation mixture. This mixture is blended again. Although the solid obtained has a low leaching rate, it still contains 600 ppm of free mercury, according to the authors. The results obtained if there is no additive load are not as good, both in terms of leaching rate and free mercury.

American patent U.S. Pat. No. 3,061,412 discloses a process for preparing mercury for manufacturing of pigments. This process is based on conversion of metallic mercury (Hg) into mercury sulphide (HgS) by elementary sulphur in the presence of an alkaline sulphur or polysulphide solution. Under the reaction conditions presented in the patent and as explicitly described by the inventors, polysulphide does not react with mercury but acts as a catalyst for the reaction in a heterogeneous (liquid-solid) phase between metallic mercury and elementary sulphur.

Few industrial sized installations are currently in operation despite this large amount of work and these many patents describing mercury stabilisation and transformation processes.

Therefore, there is still a real need for a process for stabilising metallic mercury by which mercury is transformed into a stable compound with high efficiencies, preferably close to total conversion.

One purpose of this invention is thus to disclose a simple and efficient process making use of inexpensive reagents.

It is to the merit of the inventors that they have discovered that it is possible to transform metallic mercury into mercury sulphide at a rate close to total conversion by using an aqueous polysulphide solution and a means of dispersing metallic mercury in the aqueous polysulphide solution.

Thus, one purpose of the invention is a process for stabilising metallic mercury in the form of mercury sulphide, the process comprising the following steps:

a) disperse metallic mercury in an aqueous polysulphide solution making use of a dispersion means so as to convert metallic mercury into mercury sulphide;

b) separation of the mercury sulphide obtained.

Due to the dispersion of metallic mercury in the aqueous polysulphide solution, the process according to the invention can simply and efficiently convert metallic mercury into mercury sulphide. Conversion is done in a single step and the conversion ratio is very high. In particular, it is greater than or equal to 99.8%, preferably greater than or equal to 99.9%, and even more preferably greater than or equal to 99.99%. In one particularly preferred embodiment, the conversion ratio is greater than or equal to 99.999%. For comparison, the Applicant has reproduced example 1 from U.S. Pat. No. 3,061,412 and thus showed that the efficiency of the process described in this patent based on a reaction in a heterogeneous phase between liquid metallic mercury and solid elementary sulphur making use of a conventional blender is significantly lower than the efficiency of the process according to the invention (see Example 6).

Dispersion of metallic mercury in the aqueous polysulphide solution in step a) is done using a dispersion means. Any dispersion means capable of dispersing mercury in the polysulphide solution and enabling the reaction between metallic mercury and polysulphide so as to form mercury sulphide with a conversion ratio like that defined above can be used. For example, ultrasounds or blenders with a high shear rate, such as dispersers, can be used.

Compared with conventional mechanical stirring, for example using a blender, dispersing metallic mercury in the aqueous polysulphide solution using a dispersion means has the advantage of improving contact between mercury and polysulphide. Without wishing to be bound by any particular theory, the inventors believe that this can firstly accelerate the reaction rate and secondly improve the efficiency above what is possible with conventional mechanical stirring of the polysulphide/mercury mixture.

Thus, in one advantageous embodiment, the dispersion means are ultrasounds. Beyond the dispersion effect, ultrasounds also perform a function of disintegrating sulphur microballs that could encapsulate mercury. Without wishing to be bound by any particular theory, the inventors believe that this disintegration effect further improves the conversion efficiency.

In another advantageous embodiment, the dispersion means is a blender with a high shear rate, particularly a disperser. Advantageously, this blender is operated at a shear speed (or peripheral speed) of 9 m/s to 24 m/s, and preferably from 14 m/s to 17 m/s.

Independently of what dispersion means is chosen, step a) is advantageously performed at a temperature higher than or equal to 60° C., preferably from 60° C. to 90° C., more preferably from 70° C. to 90° C. and even more preferably from 80° C. to 90° C. Converting metallic mercury into mercury sulphide at high temperatures greater than or equal to 60° C. actually accelerates the reaction rate and is conducive to the formation of mercury sulphide in the form of cinnabar (red mercury sulphide). Lower temperatures are conducive to the formation of mercury sulphide in the form of metacinnabar (black mercury sulphide).

Thus, the dispersion of metallic mercury in the polysulphide solution at high temperature contributes to complete or quasi-complete conversion of metallic mercury to mercury sulphide. A high temperature is also conducive to the formation of cinnabar that has the advantage of being thermodynamically more stable than metacinnabar.

Unlike some processes according to prior art, particularly processes that operate dry at high temperature with powder or molten sulphur, temperatures qualified as being high within the framework of this invention remain moderate. Treatment temperatures in the process according to the invention and control of the conversion to an aqueous medium thus limit risks of diffusion of mercury vapour and inflammation.

The polysulphide solution used in step a) is advantageously a solution of an alkali metal or alkali earth polysulphide, for example such as sodium or potassium polysulphide. This solution can be prepared by any method known to an expert in the subject. It can be produced by dissolving sulphur in a solution of an alkali or alkali earth sulphide, for example of sodium, potassium or calcium, and preferably sodium. It can also be prepared by dissolution of sulphur in an aqueous solution of an alkali or alkali earth hydroxide, such as soda, potash, or an aqueous solution of calcium hydroxide, preferably in soda.

The polysulphide solution advantageously has an $S/Na_2S$ molar ratio equal to 2.5 to 4.0, preferably from 2.7 to 3.5 and more preferably from 3 to 3.3.

The active sulphur content in the polysulphide solution is advantageously from 0.5 to 7 mol/kg, preferably from 0.5 to 5 mol/kg, and more preferably from 0.6 to 3.5 mol/kg. In one particular embodiment, the active sulphur content is 0.6 to 1.4 mol/kg, for example about 1 mol/kg. In another particular embodiment, the active sulphur content is 2.5 to 3.5 mol/kg, for example about 3 mol/kg.

"Active sulphur" ($S_{active}$) means sulphur in the zero oxidation state that can react with mercury in an oxidation-reduction reaction to form mercury sulphide.

The metallic mercury used in step a) can originate from different sources. In particular it can originate from dismantling of installations such as units for chlorine production, for distillation of mercury from soiled materials, for purification of hydrocarbons extracted from some natural deposits or from any other process for separation and extraction of metallic mercury. Mercury can also be derived from batteries, measurement instruments, dental amalgams. The process according to the invention can be applied even if the metallic mercury contains water, fine sediments or other inorganic pollution such as heavy metals.

In the meaning used in this invention, "metallic mercury" means elementary mercury (Hg) in oxidation state 0.

In one aspect of this invention, the $S_{active}$/Hg mass ratio is 1 to 3, for example from 1.2 to 2.6, preferably from 1.2 to 1.5, and even more preferably about 1.3. Surprisingly and unexpectedly, the inventors have observed that excess sulphur from 1.1 to 1.5, particularly about 1.2 to about 1.3 gives rise the formation of cinnabar ($\alpha$-HgS) while higher values of excess sulphur, for example 2.6 or more, lead to the formation of metacinnabar ($\beta$-HgS).

The Hg/polysulphide solution mass ratio is advantageously from 0.2 to 0.6. In one particularly advantageous embodiment, the Hg/polysulphide solution mass ratio is about 0.6 and the active sulphur content of the polysulphide solution is about 3 mol/kg. It is thus possible to perform the installation process in a relatively restricted reaction volume and thus make the treatment installation more compact.

The mercury sulphide obtained in step a) can be separated using any adapted separation means. For example, separation may be done by filtration, settlement, centrifuging. In one embodiment, separation is done using a filter press.

The volatile mercury content in the mercury sulphide obtained from the process according to the invention is less than the limiting occupational exposure limit that is 50 $\mu g/m^3$ in France, and even less than 10 $\mu g/m^3$, according to the washing flask test described in example 5. For comparison, the volatile mercury content is 800 $\mu g/m^3$ for mercury sulphide obtained according to example 1 in U.S. Pat. No. 3,061,412.

The process according to the invention also has the advantage that it optimises the residual quantity of mercury to be stored because there is no excess reagent in the recovered mercury sulphide.

The used polysulphide solution remaining after separation of mercury sulphide in step b) can be reused in the process according to the invention. This reuse of polysulphide has an economic and ecological advantage because it maximises the consumption of active sulphur and minimises the release of effluents that have to be treated.

Therefore, according to one advantageous embodiment, the process according to the invention includes the following steps, after step b):

c) recovery of the polysulphide solution after the separation of mercury sulphide in step b);

d) addition of sulphur and possibly $Na_2S$ to the polysulphide solution recovered in step c);

e) repetition of steps a) and b), using the polysulphide solution derived from step d);

f) possibly, one or several repetitions of steps c) to e).

According to this particular embodiment, at least one and preferably several recyclings of the polysulphide solution are made. During these recycling operations, the addition of sulphur to the polysulphide solution in step d) keeps the active sulphur content in the polysulphide solution constant. Advantageously, the molar ratio between added sulphur and the metallic mercury to be treated (Sadded/Hg) is about 1. According to one variant, $Na_2S$ is also added into the recycled polysulphide solution. Each recycling cycle is then performed with essentially the same active sulphur content as in the initial cycle.

The process according to the invention, with or without recycling of the polysulphide solution, is advantageously done in batches so that the production of mercury sulphide can be started and stopped at any time depending on needs.

The invention also relates to a treatment installation for implementation of the mercury stabilisation process in the form of mercury sulphide, said installation comprising:

a reactor capable of holding an aqueous solution of polysulphide and metallic mercury and equipped with at least one dispersion means to disperse metallic mercury in the polysulphide solution so as to convert metallic mercury into mercury sulphide, and means of separation of the mercury sulphide formed.

The dispersion and separation means that can be used are as described above with reference to the mercury stabilisation process according to the invention. When a disperser is used, it will advantageously be installed in the bottom of the reactor to take account of the high density of metallic mercury. In this embodiment, the reactor is preferably also equipped with additional stirring means configured to assure that the suspension is homogeneous.

Separation means that can be used are as described above with reference to the mercury stabilisation process according to the invention. A filter press will be used in one preferred embodiment.

In one embodiment, the reactor is also equipped with heating means so that the conversion from mercury to mercury sulphide can be made at high temperature, particularly at a temperature higher than or equal to 60° C., preferably from 60° C. to 90° C., more preferably from 70° C. to 90° C. and even more preferably from 80° C. to 90° C.

The installation may also include storage means such as a storage tank for the used polysulphide solution. These storage means are advantageously connected to the reactor so that the used polysulphide solution can be recycled.

The invention is described in more detail below, through the following examples that are in no way limitative but are given solely as examples.

EXAMPLES

Preparation of Polysulphide Solutions

The polysulphide solutions used in the following examples have been manufactured by dissolution of flower of sulphur in a sodium sulphide solution.

The sodium sulphide solution was prepared from technical quality flaky sodium sulphide. This compound contains 60% $Na_2S$.

The precise compositions of the different polysulphide solutions used are given in Table 1 below.

TABLE 1

| Example | Water (g) | Pure $Na_2S$ (g) | Pure $Na_2S$ (moles) | S (g) | S (moles) | $Na_2S$/S (moles/moles) | $S_{active}$ (moles) | $c(S_{active})$ (mol/kg) |
|---|---|---|---|---|---|---|---|---|
| 1 | 68.6 | 1.24 | 0.02 | 1.57 | 0.05 | 3.08 | 0.03 | 0.46 |
| 2 | 1000 | 22.10 | 0.28 | 29.92 | 0.94 | 3.30 | 0.65 | 0.61 |
| 3 | 1000 | 44.20 | 0.57 | 59.84 | 1.87 | 3.30 | 1.30 | 1.15 |

TABLE 1-continued

| Example | Water (g) | Pure Na$_2$S (g) | Pure Na$_2$S (moles) | S (g) | S (moles) | Na$_2$S/S (moles/moles) | S$_{active}$ (moles) | c(S$_{active}$) (mol/kg) |
|---|---|---|---|---|---|---|---|---|
| 3bis | 1000 | 68.00 | 0.87 | 92.06 | 2.88 | 3.30 | 2.01 | 1.66 |
| 4 | 1000 | 44.40 | 0.57 | 54.65 | 1.71 | 3.00 | 1.14 | 1.01 |
| 5 | 300 | 53.28 | 0.68 | 65.58 | 2.05 | 3.00 | 1.37 | 3.01 |

During preparation of the polysulphide solution, some of the sodium sulphide used reacts with some of the added sulphur in a secondary dismutation reaction to form thiosulfate. The remaining sulphur in the zero oxidation state is active sulphur. In the framework of this invention, it is considered that the quantity in moles of active sulphur in the polysulphide solution is equal to the quantity in moles of sulphur used minus the equivalent in moles of sulphide added into the solution.

Example 1: Classical Mechanical Stirring 2.07 g of technical Na$_2$S (namely 1.24 g of pure Na$_2$S), 1.57 g of sulphur and 68.6 g of water were mixed in a 250 ml beaker. The S/Na$_2$S molar ratio of the resulting polysulphide solution was 3 and the content of active sulphur was 0.46 mol/kg.

5 mg of metallic mercury was added after the dissolution of sulphur.

The mixture was stirred by a magnetised bar rotating at a speed of 300 rpm. The formation of a black deposit of mercury sulphide was quickly observed. No more metallic mercury could be distinguished in a visual examination after 4 h30 of reaction. The conversion efficiency is more than 90%. 1/17 g of sulphur was then added.

The reaction rate reduces over time. Thus, after 24 hours of stirring, even with excess sulphur equal to 2.6 times stoichiometry, the conversion efficiency does not exceed 99.5%. This relatively low efficiency appears to be due to encapsulation of mercury in mercury sulphide microspheres. This mercury then becomes difficult to access under conventional stirring conditions.

Example 2: Use of an Ultrasound Generator Probe (S$_{active}$/Hg Mass Ratio of 2.6)

For this example, an ultrasound generator probe (L250 mm—20 kHz—300 W) made by Sinaptec composed of a NexTgen ultrasound generator at a frequency of 20 kHz was used, with a radial effect probe for uniform diffusion of ultrasound over its entire height.

A polysulphide solution with a content of active sulphur equal to 0.61 mol/kg and an S/Na$_2$S molar ratio equal to 3.3 was prepared by adding 36.8 g of technical Na$_2$S (namely 22.1 g of pure Na$_2$S) and 29.9 g of sulphur in one litre of demineralised water.

17.5 g of metallic mercury was mixed in 350 mL of this polysulphide solution (S$_{active}$/Hg molar ratio equal to 2.6). The mixture was placed in a 400 ml Erlenmeyer flask. The probe was held in place by a bracket and was immersed in the solution. The reaction started at ambient temperature. The temperature increased to reach 80° C. during the test. Water was added regularly to compensate for evaporation and to stabilise the temperature.

9 recycling cycles were made after the first treatment cycle. The quantity of mercury added in all recycling cycles was identical to the quantity added in the first cycle (17.5 g of Hg for 350 mL of the cycle n−1 filtrate). The results are summarised in Table 2 below.

TABLE 2

| Cycle No. | Added S (g) | Added Na$_2$S (g) | Initial pH | Time | Solid | conversion % |
|---|---|---|---|---|---|---|
| 1 | 0 | 0 | na | 2 h | Black | 99.9995 |
| 2 | 2.9 | 0 | na | 2 h | Black | 99.9999 |
| 3 | 2.91 | 0 | 11.9 | 2 h | Black | 99.9999 |
| 4 | 2.91 | 0 | na | 2 h | Black | 99.9165 |
| 5$^a$ | 2.91 | 0 | 12 | 2 h | Black | 99.9304 |
| 6$^a$ | 2.92 | 0 | 12 | 2 h 30 | Black | 99.9524 |
| 7$^a$ | 2.92 | 2.15 | 11 | 2 h | Black | 99.9991 |
| 8 | 2.89 | 2.17 | 11.8 | 2 h | Black | 99.9999 |
| 9 | 2.89 | 2.14 | 12 | 1 h 30 | Brown | 99.9994 |
| 10 | 2.32 | 0 | na | 2 h | Red | 99.9999 |

$^a$NaOH added to adjust pH

These tests show that a dispersion of mercury by ultrasound can considerably increase the conversion ratio of metallic mercury into mercury sulphide. During recycling, the supplementary addition of sulphide improves the conversion ratio. The last cycle (cycle No. 10) was done with less sulphur than the previous cycles (80% of the theoretical value). This test showed that reducing excess sulphur relative to mercury orients the reaction towards the red α-HgS form, while a larger excess is conducive to the formation of black β-HgS.

Example 3: Use of an Ultrasound Generator Probe (S$_{active}$/Hg Mass Ratio of 1.3)

The test in example 2 was repeated with a polysulphide solution obtained by mixing 73.7 g of technical Na$_2$S (namely 44.2 g of pure Na$_2$S) and 59.8 g of sulphur in 1 litre of demineralised water. The active sulphur content was 1.15 mol/kg and the S/Na$_2$S molar ratio was 3.3. Excess sulphur above stoichiometry was fixed at 1.3. The quantity of mercury engaged was 70.2 g per 350 mL of polysulphide solution.

4 recycling cycles were made after the first treatment cycle. The quantity of mercury added in all recycling cycles was identical to the quantity added in the first cycle (70.2 g of Hg for 350 mL of the cycle n−1 filtrate). The results are summarised in Table 3 below.

TABLE 3

| Cycle No. | Added S (g) | Added Na$_2$S (g) | Initial pH | Time | Solid | Conversion % |
|---|---|---|---|---|---|---|
| 1 | 0 | 0 | na | 2 h | Red | 99.9999 |
| 2 | 11.3 | 0 | 12.5 | 2 h | Red | 99.9675 |
| 3 | 11.3 | 0 | 12.5 | 2 h 30 | Red | 99.8904 |
| 4 | 11.3 | 2.14 | 12.5 | 2 h | Red | 99.9999 |
| 5 | 11.1 | 1.32 | na | 2 h | Brown | 99.9628 |

The results are comparable to those in example 2. The production of the red α-HgS form is confirmed for an S$_{active}$/Hg ratio=1.3. Addition of complementary sulphur during recycling cycles improves the conversion ratio. The drop in the conversion efficiency for cycle No. 5 despite the addition of sulphur is due to the dismutation of sulphur (secondary reaction giving rise to the formation of thiosulfate) induced by this addition of complementary sulphur. This phenomenon that reduces the available quantity of active sulphur can be counteracted by increasing the quantity of added sulphur.

Another test (Example 3bis) was performed with a polysulphide solution prepared using 113.3 g of technical $Na_2S$ (namely 68 g of pure $Na_2S$), 92.1 g of sulphur and 1 litre of demineralised water. The active sulphur content was then 1.66M and the $S/Na_2S$ molar ratio was 3.3. The $S_{active}/Hg$ mass ratio was fixed at 1.3, namely 105 g of mercury for 350 mL of polysulphide solution. The treated mercury quantity was thus about 30% of the mass of the polysulphide solution. After 2 h with the ultrasound probe, the product obtained is red and the conversion efficiency is 99.999%.

Example 4: Use of a Disperser (Content of Active Sulphur 1M, $S_{active}/Hg$ Mass Ratio of 1.2)

For this example, an Ultra-Turrax T18 laboratory disperser made by IKA equipped with a 19G (19 mm diameter) tool was used. The rotation speed is adjustable between 3000 and 25000 rpm. Note that friction increases the temperature of the medium at high speeds higher than about 17 000 rpm.

A series of 20 tests with recycling of the solution was carried out under the following conditions:

The polysulphide solution was prepared with 74 g of technical $Na_2S$ (44.4 g of pure $Na_2S$), 54.6 g of sulphur and 1 litre of demineralised water.

The active sulphur content of the polysulphide solution was 1.01 mol/kg and the $S/Na_2S$ molar ratio was 3.

The quantity of mercury treated per cycle was 190 g, giving an $S_{active}/Hg$ mass ratio=1.2

Stirring speed 15 000 to 18 000 rpm

Reaction time: 1 h50

Start temperature: 80° C.

One litre of polysulphide solution was placed in a conical flask. The disperser was held by a bracket and immersed in the mixture. At the end of the indicated reaction time, the mixture was filtered using a Büchner filter. The cake was recovered by filtration and kept without being dried for future analyses.

The results are summarised in Table 4 below.

TABLE 4

| | Mercury (g) | $Na_2S$ (g) | S (g) | NaOH in 50% solution (g) | Conversion (%) |
|---|---|---|---|---|---|
| Cycle 1 (initial) for 1000 ml of water | 190 | 74 | 54.7 | | 99.99995 |
| Cycle 2 | 190 | 7.5 | 30.3 | 10 | 99.99958 |
| Cycle 3 | 190 | 7.5 | 30.3 | | 99.99991 |
| Cycle 4 | 190 | 7.5 | 30.3 | | 99.99998 |
| Cycle 5 | 190 | 0 | 36 | 10 | 99.99998 |
| Cycle 6 | 190 | 0 | 30.3 | | 99.98740 |
| Cycle 7 | 190 | 7.5 | 32 | | 99.99995 |
| Cycle 8 | 190 | 7.5 | 32 | | 99.99883 |
| Cycle 9 | 190 | 0 | 30.3 | | 99.99999 |
| Cycle 10 | 190 | 7.5 | 32.6 | | 99.99935 |
| Cycle 11 | 190 | 0 | 30.3 | 6 | 99.99998 |
| Cycle 12 | 190 | 0 | 30.3 | 6 | 99.99920 |
| Cycle 13 | 190 | 3.75 | 31 | | 99.99997 |
| Cycle 14 | 190 | 3.75 | 31 | | 99.99998 |
| Cycle 15 | 190 | 3.75 | 31 | | 99.99994 |

TABLE 4-continued

| | Mercury (g) | $Na_2S$ (g) | S (g) | NaOH in 50% solution (g) | Conversion (%) |
|---|---|---|---|---|---|
| Cycle 16 | 190 | 3.75 | 31 | | 99.99999 |
| Cycle 17 | 190 | 3.75 | 31 | | 99.99999 |
| Cycle 18 | 190 | 3.75 | 31 | | 99.99998 |
| Cycle 19 | 190 | 3.75 | 31 | | 99.99999 |
| Cycle 20 | 190 | 3.75 | 32 | | 99.99999 |
| Total | 3800 | 149 | 648.4 | 32 | |
| average | | | | | 99.9992 |

Not all the tests were done under the same conditions. Cycles 1 to 6 were done in a square metallic bath, the other tests were done in a 1 litre Erlenmeyer flask. For cycles 1 to 12, the addition of sulphur and the compensation for dismutation of sulphur were not systematic. The solution was initially heated to 80° C. but the temperature was not kept constant throughout the reaction. The stirring speed was constant at 18 000 rpm Starting from cycle 13, the procedure was more systematic with the constant addition of sulphur corresponding to 5% of the initial quantity and compensation for dismutation of sulphur. The disperser speed was set to 18 000 rpm for the first 15 minutes and then to 1500 rpm. A conversion from the metacinnabar form to the cinnabar form was observed after 50 minutes' reaction time. The mercury sulphide obtained is then constant quality with a conversion ratio of more than 99.9999%.

A leaching test according to standard NF EN 12457-2 made with this same average sample gives a value of leachable mercury equal to 1.1 mg/kg. If the leachate is filtered to a threshold of 0.2 μm (instead of 0.45 μm according to the standard), the value is 0.1 mg/kg. This indicates that the measured mercury is not soluble mercury but is composed of fine HgS particles.

Example 5: Use of a Disperser (Content of Active Sulphur 3M, $S/Na_2S$ Molar Ratio=3.01, $S_{active}/Hg$ Mass Ratio of 1,2)

The polysulphide solution was made with 88.8 g of technical $Na_2S$ (namely 53.3 g of pure $Na_2S$), 65.6 g of sulphur and 300 ml of demineralised water. 228.4 g of metallic mercury was added.

The tests were done using the same protocol as for example 4, except for the flask volume that was 500 ml instead of one litre. The initial temperature was 50 to 60° C. because the reaction is significantly more exothermic than with a polysulphide solution with an active sulphur content equal to 1 M. The temperature reached 80 to 90° C. after about 10 minutes' reaction.

An analysis of volatile mercury was made. The Mercury Tracker 3000 made by Mercury Instrument was used for this test, carrying out a "washing flask test". For this test, a 100 g sample of the solid obtained is placed in a closed one-litre washing flask for 24 hours. The outlet tube is then connected to the gas analyser and the value is noted after allowing to stabilise for a few minutes.

Three successive cycles were carried out recycling the reaction solution. The results are given in Table 5.

TABLE 5

|  | Mercury (g) | $Na_2S$ (g) | S (g) | Conversion (%) | Leaching NF EN 12457-2 (mg/kg) | Volatile Hg (test in washing flask) (µg/m³) |
|---|---|---|---|---|---|---|
| Cycle 1 (initial) for 300 ml of water | 228.4 | 88.8 | 65.6 | 99.99997 | 0.7* | 1 |
| Cycle 2 | 228.4 | 8.9 | 38.5 | 99.99994 | 0.07 | 8 |
| Cycle 3 | 228.4 | 8.9 | 38.5 | 99.99997 | 0.1 | 1 |

*0.2 mg/kg with filtration to 0.2 µm

The change from the metacinnabar form to the cinnabar form occurs after 10 to 20 minutes instead of 50 minutes in the case of a polysulphide solution with an active sulphur content of 1 M. For cycle 3, the HgS cake was not rinsed during filtration. It will be noted that this does not reduce the product quality. On the contrary, a lack of very fine particles during filtration was observed after the leaching test. The quality of the products obtained is equivalent to or better than that obtained previously with an efficiency of more than 99.9999%, leaching of mercury between 0.07 and 0.7 mg/kg and a concentration of volatile mercury equal to 1 to 8 µg/m3.

Example 6: Transformation of Hg to HgS
According to Example 1 in U.S. Pat. No. 3,061,412

Example 1 in U.S. Pat. No. 3,061,412 was repeated with the same initial product quantities and the same mixing duration using a blender made by Kenwood® equivalent to the blender made by Waring® used in the patent. An exothermic reaction is observed and a very thick black sludge is recovered. This sludge was filtered and rinsed with water.

The conversion efficiency is 94.45%. The concentration of volatile mercury in the gas blanket of a one-litre flask containing 100 g of residue, measured with a Mercury Tracker 3000 analyser by placing the probe above the flask, is 800 µg. This measurement method gives lower values than the washing flask test used in Example 5.

The invention claimed is:

1. Process for stabilizing metallic mercury in the form of mercury sulphide, the process comprising the following steps:
   a) dispersion of metallic mercury in an aqueous polysulphide solution so as to convert metallic mercury into mercury sulphide;
   b) separation of the mercury sulphide,
   wherein step a) is performed at a temperature of at least 60° C.
2. Process according to claim 1, in which dispersion of metallic mercury is done using ultrasounds or a disperser.
3. Process according to claim 2, in which dispersion of metallic mercury is done using ultrasounds.
4. Process according to claim 2, in which dispersion of metallic mercury is done using a disperser.
5. Process according to claim 1, in which dispersion of metallic mercury is done using ultrasounds.
6. Process according to claim 1, in which dispersion of metallic mercury is done using a disperser.
7. Process according to claim 1, in which the polysulphide solution has an $S/Na_2S$ molar ratio equal to 2.5 to 4.0.
8. Process according to claim 1, in which the polysulphide solution has an $S/Na_2S$ molar ratio equal to 2.7 to 3.5.
9. Process according to claim 1, in which the polysulphide solution has an $S/Na_2S$ molar ratio equal to 3 to 3.3.
10. Process according to claim 1, in which the active sulphur content in the polysulphide solution is from 0.5 to 7 mol/kg.
11. Process according to claim 1, in which the active sulphur content in the polysulphide solution is from 0.6 to 3.5 mol/kg.
12. Process according to claim 1, in which the active sulphur content in the polysulphide solution is from 0.5 to 5 mol/kg.
13. Process according to claim 12, in which the active sulphur content in the polysulphide solution is from 2.5 to 3.5 mol/kg.
14. Process according to claim 1, in which the $S_{active}$/Hg mass ratio is 1 to 3.
15. Process according to claim 1, in which the $S_{active}$/Hg mass ratio is 1.2 to 2.6.
16. Process according to claim 1, in which the $S_{active}$/Hg mass ratio is 1.2 to 1.5.
17. Process according to claim 1, in which the $S_{active}$/Hg mass ratio is about 1.3.
18. Process according to claim 1, further comprising after step b):
   c) recovery of the polysulphide solution after the separation of mercury sulphide in step b);
   d) addition of sulphur and possibly $Na_2S$ to the polysulphide solution recovered in step c);
   e) repetition of steps a) and b), using the polysulphide solution derived from step d);
   f) possibly, one or several repetitions of steps c) to e).

* * * * *